UNITED STATES PATENT OFFICE.

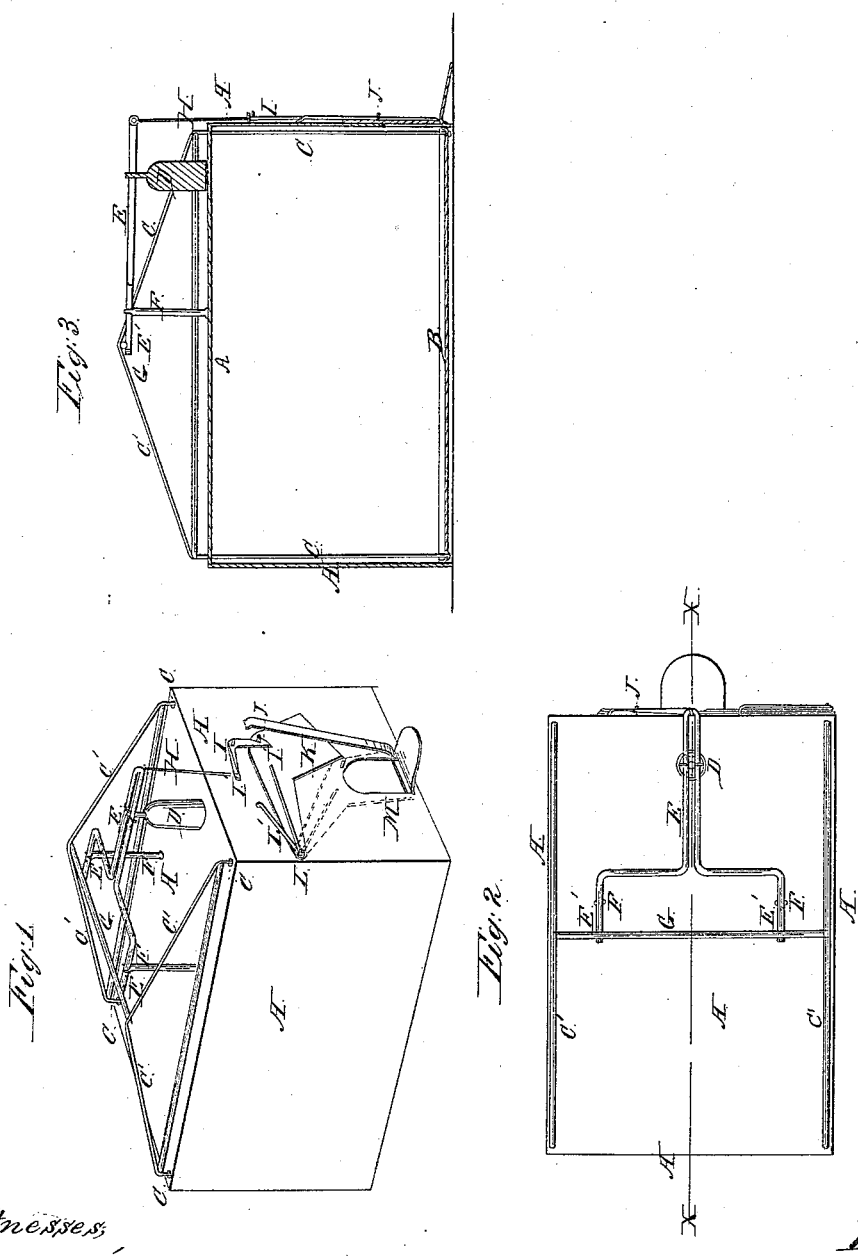

ASHER WARNER, OF CLEVELAND, OHIO.

IMPROVEMENT IN ANIMAL-TRAPS.

Specification forming part of Letters Patent No. 36,543, dated September 23, 1862.

*To all whom it may concern:*

Be it known that I, ASHER WARNER, of Cleveland, in the county of Cuyahoga and State of Ohio, have invented new and useful Improvements in Animal-Traps; and I do hereby declare that the following is a full and complete description of the construction and operation of the same, reference being had to the accompanying drawings, making part of this specification, in which—

Figure 1 is a perspective view. Fig. 2 is a top view, and Fig. 3 is a vertical section in the direction of the line $x\ x$ in Fig. 2.

Like letters refer to like parts in the several views.

The nature of my invention relates to such a construction of a trap that it may be graduated to any desired number of small animals, or to a quantity by weight. For example, if the trap is intended for rats, the construction is such that it can be so graduated that it will require five, ten, fifteen, or twenty (more or less) to spring it, depending upon the position of the graduating-weight upon the bar.

The trap can be varied in form and size to suit other small animals; but it is intended chiefly for rats, which so largely infest our seaboards and warehouses.

A represents the outer case. This consists of a cubical box having its sides and ends parallel and the top properly secured. The whole may be made of tin-plate, sheet-iron, or wood, as most convenient. The bottom B fits in accurately, but loosely, so that it can play up and down with ease. This bottom B is balanced above the top by a weight, D, resting upon the lever E, the fulcrum of which is seen at F. The lever divides, so that it has two branches for the short arm, as seen at E' E'. The cross-bar G extends over the middle of the box and connects the suspension-rods C' C', which are a continuation of the rods C C C C.

The short arms E' of the lever E support the cross-bar G, so that the weight of the platform B and all that is upon it is supported by the fulcrums F. From the forward end of the lever E a rod, H, extends down to the trigger I. This trigger I has one of its arms at right angles to the other, and is pivoted to the end of the box at its angle, as shown in Fig. 1. The rod H is connected to the end of the horizontal arm at I'. The opposite end, I'', is provided with a notch that receives the pin J upon the door K in the act of setting the trap. The door K is pivoted to the end of the box at L, and is pressed downward by a spring, L'. When the door is closed, it covers the opening M, Fig. 1, as indicated by the dotted lines. In setting this trap, meal or other bait is freely scattered over the platform B, the door K is raised, and the pin J placed lightly in the notch I'' of the trigger I. The weight D is then moved along the bar E, so as to balance any weight that is desired to spring the trap. If a large number of rats infest a neighborhood or warehouse, I set the trap for thirty, forty, fifty, or more. The animals, finding a good feeding-ground, will congregate in large numbers, and when enough have entered upon the platform to balance the weight D the weight rises and the trigger is drawn away from the pin J, and the door instantly closes. In this way I have caught as many as sixty rats at one haul.

By moving the weight D the trap can be graduated to any number.

What I claim as my improvement, and desire to secure by Letters Patent, is—

The herein-described construction of a trap having a movable platform, B, with a graduated lever, E, and weight D, or their equivalents, in combination with the trigger I and door K, operating substantially as and for the purpose set forth.

ASHER WARNER.

Witnesses:
W. H. BURRIDGE,
HENRY VOTH.